(12) United States Patent
Osborn et al.

(10) Patent No.: US 10,783,421 B2
(45) Date of Patent: *Sep. 22, 2020

(54) SYSTEM AND APPARATUS FOR ENCRYPTED DATA COLLECTION USING RFID CARDS

(71) Applicant: Capital One Services, LLC, McLean, VA (US)

(72) Inventors: Kevin Osborn, Newton Highlands, MA (US); James Zarakas, Centerville, VA (US); Saleem Sangi, Arlington, VA (US); Jeffrey Rule, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/554,881

(22) Filed: Aug. 29, 2019

(65) Prior Publication Data

US 2020/0026973 A1  Jan. 23, 2020

Related U.S. Application Data

(63) Continuation of application No. 16/359,334, filed on Mar. 20, 2019, now Pat. No. 10,438,104, which is a continuation of application No. 16/207,249, filed on Dec. 3, 2018, now Pat. No. 10,282,650, which is a continuation of application No. 16/042,502, filed on Jul. 23, 2018, now Pat. No. 10,176,418.

(51) Int. Cl.
*G06K 19/073* (2006.01)
*G06K 19/07* (2006.01)

(52) U.S. Cl.
CPC ......... *G06K 19/073* (2013.01); *G06K 19/071* (2013.01); *G06K 19/0723* (2013.01)

(58) Field of Classification Search
CPC .................................................. G06K 19/073
USPC ................................................. 235/492, 451
See application file for complete search history.

(56) References Cited

U.S. PATENT DOCUMENTS

| | | |
|---|---|---|
| 6,873,260 B2 | 3/2005 | Lancos et al. |
| 7,290,709 B2 | 11/2007 | Tsai et al. |
| 8,074,877 B2 | 11/2011 | Mullen et al. |
| 8,489,112 B2 | 7/2013 | Roeding et al. |
| 9,940,571 B1 | 4/2018 | Herrington |
| 2005/0195975 A1 | 9/2005 | Kawakita |
| 2008/0103968 A1 | 5/2008 | Bies et al. |

(Continued)

FOREIGN PATENT DOCUMENTS

EP  1 265 186  4/2005

OTHER PUBLICATIONS

SmartCards and RFID, University of Nijmegen.

(Continued)

*Primary Examiner* — Allyson N Trail
(74) *Attorney, Agent, or Firm* — Hunton Andrews Kurth LLP

(57) ABSTRACT

A secure smart card is described. The smart card can include a processor, a memory and a transceiver. The smart card can communicate with various terminals and store a digital signature and other information on the card. Another terminal can validate the information stored on the smart card using the digital signature. In certain embodiments, the terminal can also validate the information by using a blockchain. The advanced design of the smart card obviates the need for a network connection.

20 Claims, 5 Drawing Sheets

(56) References Cited

U.S. PATENT DOCUMENTS

| | | |
|---|---|---|
| 2009/0048026 A1 | 2/2009 | French |
| 2009/0171682 A1 | 7/2009 | Dixon et al. |
| 2010/0033310 A1 | 2/2010 | Narendra et al. |
| 2010/0312634 A1 | 12/2010 | Cervenka |
| 2010/0312635 A1 | 12/2010 | Cervenka |
| 2012/0047071 A1 | 2/2012 | Mullen et al. |
| 2012/0143754 A1 | 6/2012 | Patel |
| 2013/0026229 A1 | 1/2013 | Jarman et al. |
| 2016/0255072 A1 | 9/2016 | Liu |
| 2016/0307187 A1 | 10/2016 | Guo et al. |

OTHER PUBLICATIONS

Haykin M. et al., "Smart Card Technology: New Methods for Computer Access Control," Computer Science and Technology, 1988, NIST Special Publication 500-157.

"Component of the RFID System," RFID Design Principles, pp. 133-201.

| Store ID (501) | User ID (502) | Count No. (503) | Digital Signature (504) |
|---|---|---|---|
| 1045A89 | 559712 | 1 | 74e6f7298a9c2d |

Record (505)

FIG. 5A

| Store ID (501) | User ID (502) | Count No. (503) | Digital Signature (504) |
|---|---|---|---|
| 1045A89 | 559712 | 1 | 74e6f7298a9c2d |
| 104679FD | 559712 | 1 | fbdb1d1b18aa6c |

Record (505)
Record (506)

FIG. 5B

| Store ID (501) | User ID (502) | Count No. (503) | Digital Signature (504) |
|---|---|---|---|
| 1045A89 | 559712 | 2 | b613679a0814dd |
| 104679FD | 559712 | 1 | fbdb1d1b18aa6c |

Record (507)
Record (506)

FIG. 5C

SYSTEM AND APPARATUS FOR ENCRYPTED DATA COLLECTION USING RFID CARDS

CROSS REFERENCE TO RELATED APPLICATION:

The subject application is a Continuation of U.S. application Ser. No. 16/359,334 filed Mar. 20, 2019, which is a Continuation of U.S. application Ser. No. 16/207,249 filed Dec. 3, 2018, which is a Continuation of U.S. application Ser. No. 16/042,502 filed Jul. 23, 2018, the contents of which is hereby incorporated by reference in their entireties.

BACKGROUND

Advancements in communication technology have revolutionized the way customers interact with service providers and product sellers. Technologies such as the Internet have made it easier for customers to purchase products remotely. At the same time, various innovations have been introduced in connection with methods of payment. These innovations make customers less dependent on paper money. Payment cards which facilitate transactions using electronic money are an example of such innovations. These cards have simplified in-store and online transactions, and they offer unique security features which make them safer than cash.

SUMMARY

Payment cards such as credit cards and debit cards have become very popular among the users, and as a result, it is very common for a user to carry multiple payment cards in his or her wallet. Yet designers, manufacturers and service providers of these cards have been reluctant to introduce new technology for these cards. For example, magnetic stripe cards have been in service for many years despite the availability of alternative technology which is far superior. Moreover, certain service providers of payment cards have been hesitant to add alternative functions to these cards because these service providers believed the addition of these functions could compromise the security and safety of these cards. In other words, they believed that, from the technical standpoint, it was not possible to adequately protect the information stored on these cards. Furthermore, some service providers did not allow third parties to add applets to their payment cards because the applets could compete with their own platform. Therefore, payment cards generally performed only one function, and that was a payment function. However, given the popularity of these cards, there can be significant benefits in introducing new technology and functions for payment cards.

At the same time, with the expansion of Internet transactions, the demand for in-store products and services has been weak. To address this issue, retailers and other stores have encouraged customers to visit their locations because customers who visit stores are more likely to make purchases in-store as opposed to online. For example, some stores have offered coupons to encourage customers to visit their locations. Other stores have created loyalty programs which reward customers for purchasing a product from the store. However, these rewards programs require a customer to make an actual purchase to reward the customer, i.e., once the customer makes a purchase, certain credit value will be added to the customer's account. Nevertheless, these programs have failed to attract customers to stores because these programs fail to dynamically address customers' needs and demands. For example, it is not possible to increase the value of a coupon after the coupon is printed. Yet, as the demand for a product fluctuates, stores need to be able to change the coupon values to address the fluctuation. Therefore, it is beneficial to use a smart card which can respond to customer needs and demands in a dynamic fashion.

To encourage customer visits to stores and dynamically respond to customers' needs and demands, a store can track customer visits to the store's location. For example, it is beneficial to introduce a device which can create a record of customer visits to various locations. It is also beneficial to introduce a device which can determine which products a customer has expressed interest in when the customer visited a store. It is also beneficial to implement a device which can determine how many stores, or which stores the customer visits before the customer makes a purchase. In short, it is beneficial to provide customers with a device which can encourage them to visit a store and at the same time track their shopping behavior when they visit the store. Some believe offering customer's rewards cards can address these issues.

However, offering each customer a standalone reward card or device would not be effective because customers generally resist the idea of carrying additional cards or devices. It is inconvenient for customers to carry additional cards (e.g., a different reward card for each store) in their wallets, particularly when they have many credit cards to carry. In addition, oftentimes customers shop spontaneously, which means that, unless they have the card with them in their wallets, it is unlikely for them to use the card at that time.

Therefore, it is an object of this disclosure to describe a smart card which can function both as a payment card and as a mean for tracking customer behavior particularly with respect to customer visits to stores. Customer behavior can be tracked by collecting certain data each time the customer visits a store. For example, certain data can be collected and stored on the smart card if the customer scans the customer's smart card each time the customer visits a store. The smart card can register the time of the visit and the identity of the location where the customer visited. The smart card can also count the number of times the customer visited each store. In certain embodiments, the smart card can retain a reward value for the customer's visit to the stores. This information can be accompanied by a digital signature to ensure that its authenticity can be verified when the customer requests redemption of any rewards stored on the card. Additionally, to enhance the security of the data, this information can be simultaneously stored in a blockchain so that it is verifiable at the point when the customer requests redemption of the rewards.

The information stored on the customer's card can be used to, for example, offer a discount, credit or reward to the customer when the customer makes a purchase at the same or a different store. Additionally, this data can be used by the merchants to track their customers' behaviors. For example, each time the customer scans the smart card, the merchant receives an identity of the customer, and thus, the merchant can study each customer's shopping pattern.

The smart card of the present disclosure can offer an integrated rewards program which does not require network integration. Specifically, various merchants can join forces to offer a rewards program shared by all of them. Because all the information pertaining to a customer's shopping interactions with each merchant is stored on the card, the rewards program would obviate the need for integrating each merchant's computer network with the networks of other merchants or service providers. Moreover, the smart card can create a universal rewards program which is usable by all the merchants.

Furthermore, the fact that the smart card can function both as a mean for payment and as a mean for tracking customer behavior in stores can be beneficial in that a customer is more likely to carry the smart card as the customer's primary payment card. Specifically, because the card does not require an actual purchase to reward the customer when visiting a store, the customer is more likely to carry the card as a mean of payment as opposed to a card that does not have this capability. In addition, once the customer decides which product or service to purchase, the customer is more likely to use the smart card because the customer is more likely to want to redeem the customer's reward points or credit.

BRIEF DESCRIPTION OF THE DRAWINGS

FIGS. 5A-C show example data structures stored on an example smart card.

DETAILED DESCRIPTION

Figure 1A:
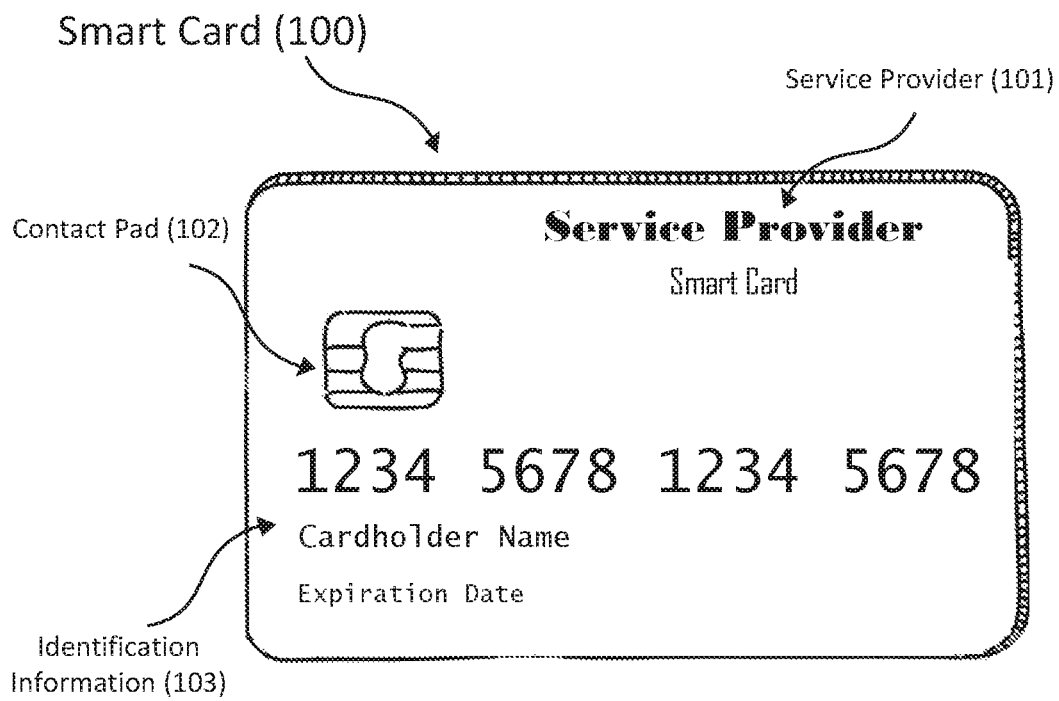
FIG. 1A illustrates a smart card according to an example embodiment.

The size of a smart card can be the same as the size of a payment card, credit card or a debit card. According to ID-1 of the ISO/IEC 7810 standard, the dimensions of a smart card can be 85.60 by 53.98 millimeters (3.37 in×2.13 in). However, a smart card according to these disclosures can have a different size, and it is not necessary for a smart card to be implemented in a payment card.

A smart card can include processing circuitry for storing and processing information. The processing circuitry can include processors, memories, error and parity/CRC checkers, data encoders, anticollision algorithms, controllers, command decoders, security primitives and tamperproofing hardware.

The storage of information can take place in a memory of the processing circuitry, which can be a read-only memory, write-once read-multiple memory or read/write memory, e.g., RAM, ROM and EEPROM. A smart card can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

The memory of a smart card can be divided into several zones, each provided with a different level of security. The smart card processor can keep track of which memory addresses belong to which zones and the circumstances under which each zone can be accessed. A smart card processor can also process information and store the information onto the memory. In an example embodiment, a smart card memory can be divided into four zones: a secret zone, a confidential zone, a usage zone, and a public zone.

A secret zone can be used for storage of information which can be used only by the processor itself, e.g., passwords, cryptographic keys. The information stored in this zone is not readable outside of the smart card. In an embodiment, the secret zone can be implemented with a separate processor that is capable of performing cryptographic functions. Cryptographic keys can be passed in to the secret zone or can be generated in the secret zone, and in either case the keys can be stored in the secret zone and used to support cryptographic services. If necessary, cryptographic keys can be exported from the secret zone.

In an example embodiment, the smart card can be a JavaCard which can include one or more applets. The applets can be firewalled, and data can be allocated to the applet for storage. The data can be stored transactionally in an EEPROM flash memory, e.g., if the write isn't complete when the power is removed, the contents remain the same as before.

A confidential zone can be used to store a list of all transactions made with the card. The confidential zone can have password protection. In an example embodiment, the password is known only to the card issuer, who can examine the history of the card for evidence of misuse of the system. The confidential zone can have a read-only access restriction so that the information stored in this zone could not be modified, e.g., transaction list could not be modified.

A usage zone could be used for storage of information which can be periodically updated or modified. Depending on the sensitivity of the data, a password can be implemented for this zone. The usage zone can have both read and write access protected by a password.

A public zone can be used for keeping nonsensitive information, such as the card issuer's name and address. The public zone can have read-only access, without a password.

Some smart cards can require physical contact with a terminal (or reader/writer, reader, or scanner) to provide the information stored on the card to the terminal or to write information on the card. Other smart cards can be contactless, i.e., the cards can wirelessly communicate with the terminal. A contactless smart card can be a credit card including a magnetic tape or a radio-frequency identification ("RFID"). Some contactless smart cards can include both the magnetic tape and the RFID tag.

A terminal can communicate with a contact smart card by establishing electrical contact between the smart card and the terminal. As such, a contact smart card can have a contact area comprising several contact pads. The area can be approximately 1 square centimeter (0.16 sq in). Establishing contact between the pads and the terminal can be achieved by inserting (or dipping) the contact smart card into a terminal. Using the electrical connection, the terminal can transmit signals to the card, and in response, the card can transmit its information to the terminal. Generally, contact smart cards do not contain a battery. However, in some embodiments, contact smart cards can include batteries.

A terminal can communicate with a contactless smart card if the contactless card is held in proximity to the terminal. The terminal can read the contactless card over a short distance using near-field communication ("NFC") technology, which uses radio frequency induction. A contactless card can include an inductor to capture some of the incident radio-frequency interrogation signal transmitted by the terminal, rectify it, and use it to power the card's processing circuitry. As such, contactless cards can function without an internal power source. However, in some embodiments, contactless smart cards can include an internal power source.

The smart card can be EMV-compliant. Europay, MasterCard and Visa ("EMV") is a payment method based upon a technical standard for smart payment cards. EMV cards can store their data on integrated circuits in addition to magnetic stripes.

The standard for contact cards can be based on ISO/IEC 7816, and the standard for contactless card can be based on ISO/IEC 14443.

FIG. 1A illustrates a smart card 100 according to an example embodiment. In this embodiment, the smart card 100 can be a payment card issued by a service provider 101 which can be displayed on the front or back of the smart card 100. The size of the smart card 100 can be compliant with ID-1 of the ISO/IEC 7810 standard, i.e., 85.60 by 53.98 millimeters. The smart card 100 can include a contact pad 102 for establishing contact with a contact terminal. The smart card 100 can also include processing circuitry, antenna and other components not displayed in FIG. 1A. These components can be located behind the contact pad 102. The smart card 100 can also include various identification information 103 displayed on front or back of the card. The smart card 100 can also include a magnetic strip or tape, which can be located on the back of the card.

In an example embodiment, the smart card is provided with a radio-frequency identification ("RFID") tag. In some embodiments, the RFID tag can include processing circuitry for storing and processing information that modulates and demodulates a radio-frequency signal (usually received from a terminal, reader/writer or scanner). An RFID tag can also include an antenna for receiving and transmitting the signal. Additionally, an RFID tag can include a power source or means for collecting DC power from the incident terminal signal. These means can include modulators, voltage regulators, resets, and connections to an antenna. The antenna can be an electric dipole antenna or a coil antenna.

There can be several kinds of RFID tags, e.g., active tags, battery-assisted passive tags and passive tags. An active tag can be electrically coupled to a power source, such as a battery, which can power the integrated circuit. As a result, an active tag can periodically transmit as a signal the information stored on the tag. A battery-assisted passive tag can have an activateable power source electrically coupled to it, and the power source can be activated when the tag is exposed to a signal from a terminal. A passive tag is not powered by a power source. Rather, the tag is energized by the radio energy transmitted to the tag by the terminal.

In an example embodiment of a passive RFID tag, the tag relies on a signal from the terminal to power up. The tag can include modulators, voltage regulators, resets, and connections to an antenna. The antenna can be an electric dipole antenna or a coil antenna, and the processing circuitry of the tag can be connected to the antenna. The type of the antenna can be determined based on the frequency band used by the tag. Typically, an electric dipole antenna is used with an ultra-high frequency tag, but high frequency tags use a coil antenna. For example, the antennas for an RFID tag can be a simple dipole if the tag uses 915-MHz frequency, but the antenna can be a complex coiled shape if the tag uses 13.56-MHz frequency. The antenna captures and transmits signals to and from the terminal. The coupling from the terminal to the tag provides both the transmission data and the power to operate the passive RFID tag.

Figure 1B:
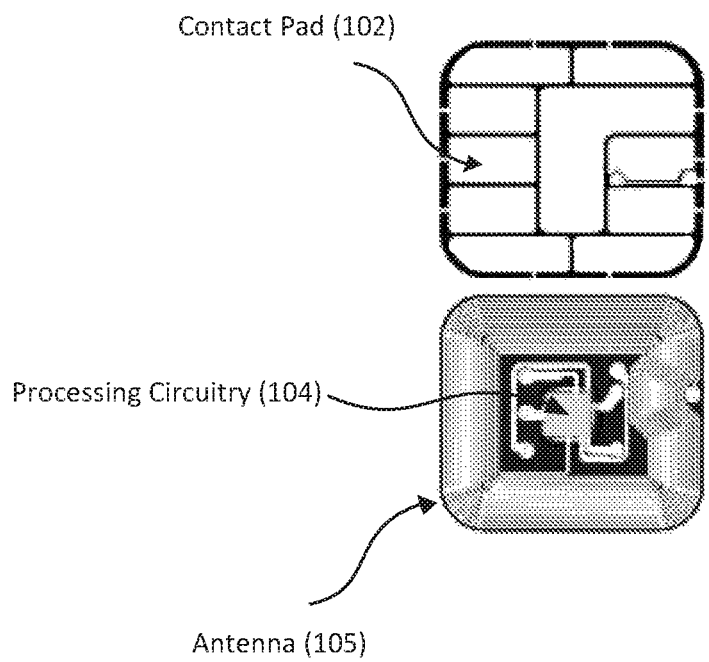
FIG. 1B illustrates an exemplary contact pad including an RFID tag behind the contact pad.

FIG. 1B illustrates an exemplary contact pad 102 including an RFID tag behind the contact pad 102. In this example embodiment, the contact pad 102 can include several gold-plated pads. Behind the contact pad 102, there can be processing circuitry 104 and an RFID tag. The RFID tag can include an antenna 105. In this example embodiment, the processing circuitry 104 is part of the RFID tag.

In some embodiments, the antenna of the RFID tag of the smart card can be placed within the card and around the contact pad 102. In other embodiments, the RFID tag of the smart card can include several antennas. For example, in addition to antenna 105, the smart card can include an antenna which extends around the contact pad 102 and throughout the smart card 100. Other combinations are also possible. In some embodiments, the antenna can be external to the contact pad and the processing circuitry. In some other embodiments, there can be an antenna integral with the processing circuitry and the antenna can be used with an external booster coil.

In an example embodiment, the coil of a smart card can act as the secondary of an air core transformer. The terminal can communicate with the smart card by cutting power or amplitude modulation. The smart card can infer the data transmitted from the terminal using the gaps in the smart card's power connection, which is functionally maintained through capacitors. The smart card can communicate back by switching a load on the smart card's coil or load modulation. Load modulation can be detected in the terminal's coil through interference.

There can be several types of terminals (or reader/writers or scanners), e.g., contact and contactless. A terminal can read information from a smart card and write information onto the smart card. In some embodiments, the terminal can pass information from the smart card to a host computer and write information from the host computer into the smart card. In some embodiments, the host computer can be the terminal. The terminal can provide power to the smart card and link the card's hardware interface to the host computer. Since the smart card's processor can control the actual flow of information into and out of the card's memories, the terminal can operate with only minimal processing capabilities for sending the information to the host computer.

In some embodiments, the terminal can include a processor and a transceiver. The contact type smart cards generally include an interface, which can consist of an 8-contact connector (e.g., contact pad 102). The interface can look like a small gold circle or series of squares on the surface of the card. Other arrangements are also possible. The terminal can include several connector pins. In order for a terminal to communicate with the contact-type card, the pins of the terminal's connector must physically touch the contacts on the smart card's connector during data transfer. The processor of the terminal can decode any data received from the smart card. The terminal can also update, delete or modify the information stored on the smart card.

A terminal can write data on the smart card by passing the data to the processor of the smart card. The processor can process the data and store it in the smart card's memory. A terminal can have a two-way communication with a smart card as described in ISO 14443. The smart card can include an RFID tag. The two-way communication can be digitally encoded. There can be several frequency ranges, and several proprietary formats for the two-way communication (e.g., HID in the 125 Mhz range). The 13.56 Mhz frequency range (NFC) is dominated by ISO 14443 compatible cards.

A terminal and a smart card can exchange messages, which can include commands or data. For example, a terminal can send a command message to the smart card, the smart card can process the command message in its processor and the smart card can send back a response message to the terminal. Each of the command message and the response message can include data. A message can include TLV (Type, Length and Value) data and a command such as STORE DATA command which prompts storage of the data included in the message in the smart card.

Figure 2:
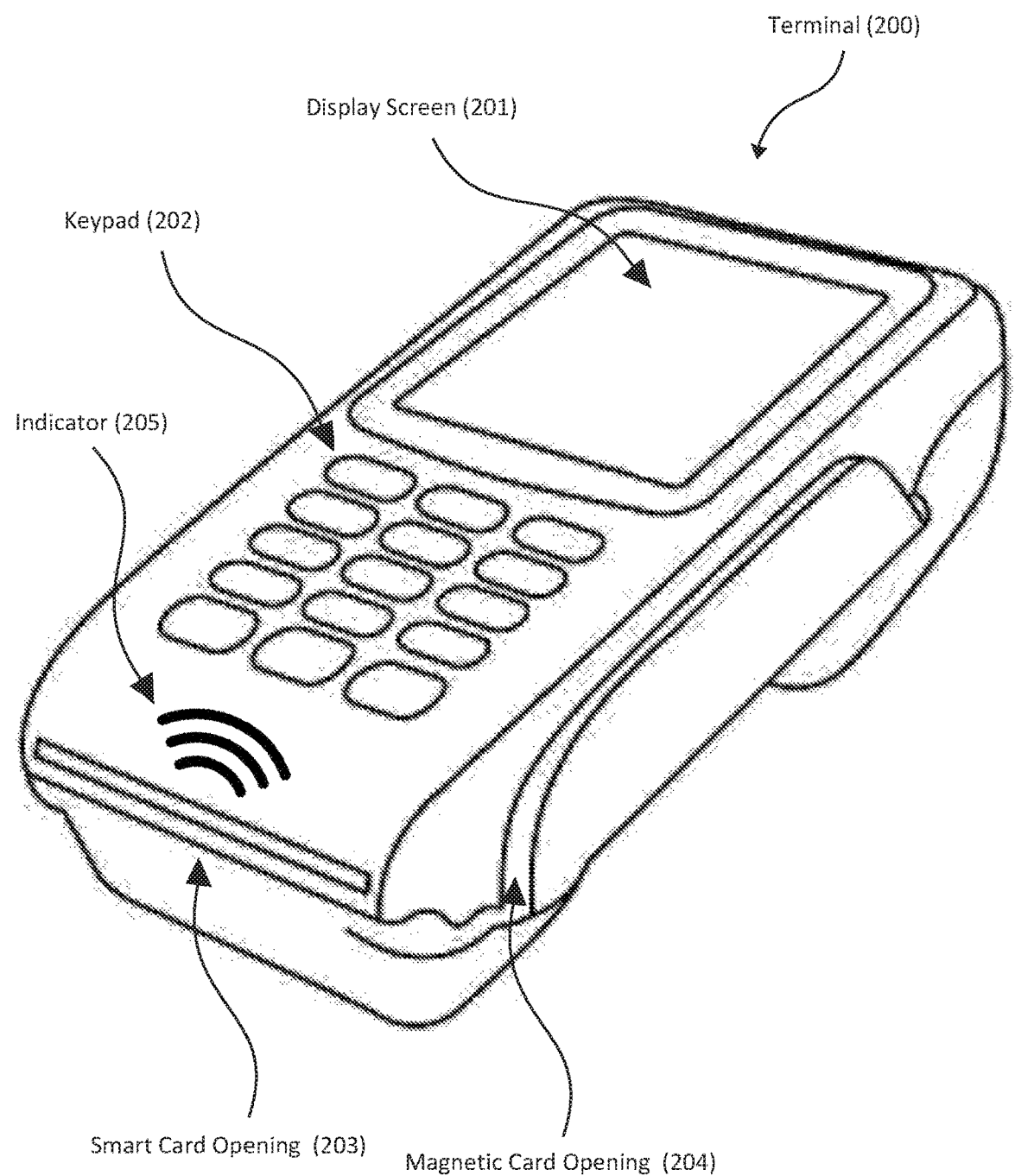
FIG. 2 illustrates a terminal according to an example embodiment.

FIG. 2 illustrates a terminal 200 according to an example embodiment. In this example embodiment, the terminal 200 can include a display screen 201. This display screen can be any type of display screen, e.g., an LCD display screen. The terminal 200 can also include a keypad 202. Using the keypad 202, a customer can enter information into the terminal 200. The terminal 200 can also include an opening 203 for inserting a smart card into the terminal 200. Using the opening 203, a customer can insert a smart card into the terminal 200 so that the pins of the terminal 200 can electrically connect with the contact pad of the smart card. In some embodiments, the terminal 200 can include a magnetic card opening 204. Using the magnetic card opening 204, the customer can swipe the smart card at the terminal 200 and the terminal 200 can obtain any information stored on the magnetic tape of the smart card.

In an example embodiment, the terminal can be a contactless RFID terminal, which can include antennas for sending and receiving signals, a transceiver, and a processor to decode data. In a passive system, the terminal can transmit an energy field that can wake up the tag and power its chip, enabling it to transmit or store data. In turn, the tag converts the radio signal into usable power, and responds to the terminal in the form of a radio signal. The signal can include the tag's identity and other information. Once the terminal receives the response, the terminal converts the response and extracts any information included in the radio signal. The information collected from the tag is then transferred through a communications interface to a host computer system, where the data can be stored in a database or analyzed by the computer system. The terminal can also update, delete or modify the information stored on the smart card.

In the example embodiment of FIG. 2, the terminal 200 is provided with one or more antennas (not displayed), which enable the device to read information from a contactless smart card and write information on the contactless smart card. The terminal 200 includes an indicator 205, which shows that the device can be contactless.

In these disclosures, the terms reader/writer, scanner and terminal have been used interchangeably, and they all refer to a device which can scan a smart card and/or write information on the smart card.

In some embodiments, the terminal can be connected to a host computer. In other embodiments, the terminal can be integrated in the host computer.

Figure 3:
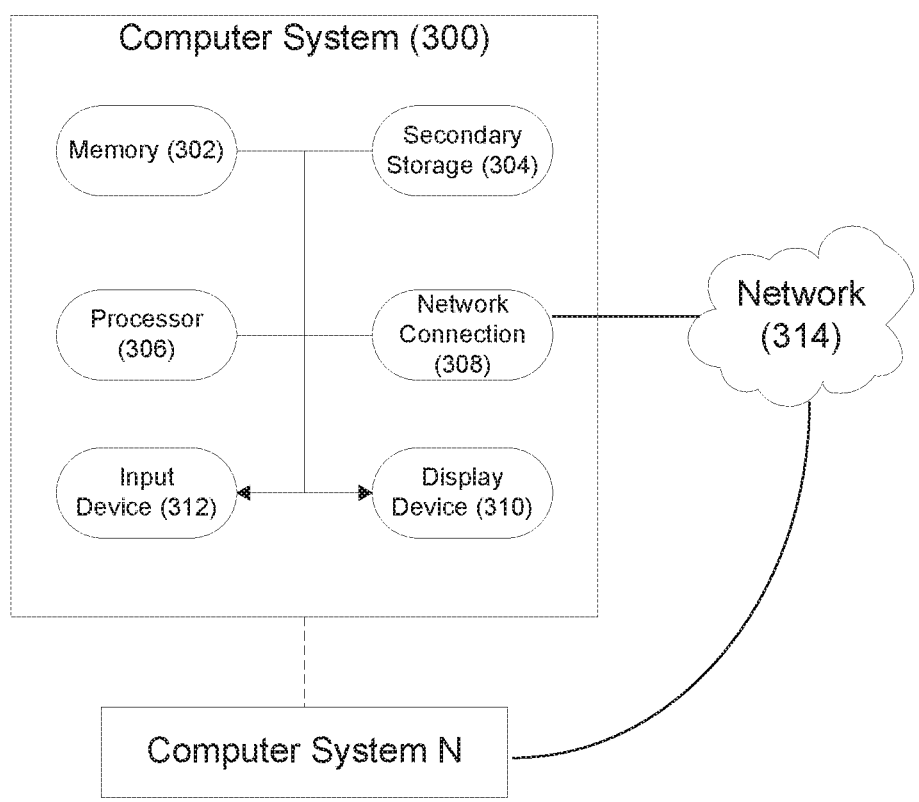
FIG. 3 illustrates exemplary hardware components for a host computer.

FIG. 3 illustrates exemplary hardware components for implementing embodiments of a host computer. A computer system 300, or other computer systems similarly configured, can include and execute one or more subsystem components to perform functions described herein, including the steps of various flow processes described in this disclosure. Likewise, a mobile device, a cell phone, a smartphone, a laptop, a desktop, a notebook, a tablet, a wearable device, a server, etc., which includes some of the same components of the computer system 300, can run an application (or software) and perform the steps and functionalities described above. Computer system 300 can connect to a network 314, e.g., Internet, or other network, to receive inquires, obtain data, and transmit information and incentives as described above. For example, using the network 314, computer system 300 can connect to a terminal. Alternatively, the terminal can be directly connected to the computer system 300.

The computer system 300 typically includes a memory 302, a secondary storage device 304, and a processor 306. The computer system 300 may also include a plurality of processors 306 and be configured as a plurality of, e.g., bladed servers, or other known server configurations. The computer system 300 may also include a network connection device 308, a display device 310, and an input device 312.

The memory 302 may include RAM or similar types of memory, and it may store one or more applications for execution by processor 306. Secondary storage device 304 may include a hard disk drive, floppy disk drive, CD-ROM drive, or other types of non-volatile data storage. Processor 306 executes the application(s), such as those described herein, which are stored in memory 302 or secondary storage 304, or received from the Internet or other network 314. The processing by processor 306 can be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 300 may store one or more database structures in the secondary storage 304, for example, for storing and maintaining the information necessary to perform the above-described functions. Alternatively, such information may be in storage devices separate from these components.

Also, as noted, processor 306 can execute one or more software applications in order to provide the functions described in this specification, specifically to execute and perform the steps and functions in the process flows described herein. Such processes can be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 300.

The input device 312 can include any device for entering information into the computer system 300, such as a touch-screen, keyboard, mouse, cursor-control device, touch-screen, microphone, digital camera, video recorder or camcorder. The input and output device 308 may be used to enter information into GUIs during performance of the methods described above. The display device 310 can include any type of device for presenting visual information such as, for example, a computer monitor or flat-screen display (or mobile device screen). The display device 310 can display the GUIs and/or output from sub-system components (or software).

Examples of the computer system 300 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 300 is shown in detail, system 300 may use multiple computer system or servers as necessary or desired to support the users and may also use back-up or redundant servers to prevent network downtime in the event of a failure of a particular server. In addition, although computer system 300 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 300, to perform a particular method, such as methods described above.

In some embodiments, the data recorded on the smart card is not backed up in the host computer or other computers. This can be advantageous for the smart card because it makes operation of the smart card independent of a network connection to a host computer. Therefore, it can be beneficial to establish the authenticity of any data stored on a smart card.

In an example embodiment, each time a terminal stores information on a card, the information includes a message authentication code (MAC), a hashed message authentication code (HMAC) or a digital signature. The MAC, HMAC or digital signature can be a mathematical code or scheme which can establish authenticity of the information stored on the smart card. For example, when a customer visits a store and the customer scans the customer's smart card at a terminal, the device can store various information, including a store ID, a time, a count number, a point value and a MAC (or HMAC or digital signature), on the customer's smart card. If the customer decides to redeem the points accumulated on the customer's smart card, the customer can scan the smart card at a second terminal. In order to ensure that the information stored on the smart card is accurate and authentic, the second terminal can use the MAC (or HMAC or digital signature) stored on the card. More specifically, the MAC (or HMAC or digital signature) establishes that the content stored on the memory of the smart card was created by a known or authorized card terminal. Moreover, in case of the digital signature, it prevents the party which stored the information onto the smart card from denying that it wrote the information. This feature can be particularly beneficial when multiple parties are involved in a rewards program.

A MAC can include the following algorithms. In the first step, a key generation algorithm can generate a key. In the second step, a signing algorithm can return a tag created using the generated key and a message. In the third step, a verifying algorithm verifies the authenticity of the message given the key and the tag.

A digital signature scheme can include the following algorithms. In the first step, a key generation algorithm generates a private key and a corresponding public key. In the second step, a signing algorithm generates a digital signature using a message and a private key. In the third step, a signature verifying algorithm can verify the message using the digital signature and the public key. A MAC differs from a digital signature in that a MAC scheme uses only one key but a digital signature scheme uses two keys, i.e., a public key and a private key.

In an example digital signature scheme, the authenticity of the digital signature generated from the fixed message and fixed private key can be verified by using the corresponding public key. Moreover, these algorithms are selected such that it is computationally infeasible to generate a valid signature for a party without knowing that party's private key. This digital signature scheme can ensure authenticity of the content stored on a smart card because if the content is digitally signed, any change in the content after signature invalidates the signature. In other words, it is practically impossible to modify the content and its signature to produce new content with a valid signature.

In the example embodiment of above, each terminal which can store information on a smart card can be provided with a private key and a signing algorithm. Moreover, each terminal which can redeem points stored on the smart card, can be provided with a public key and a verifying algorithm. When the customer scan's the customer's smart card at a first terminal, the device can store a store ID, a time, a count number, a point value and a digital signature, on the customer's smart card. The digital signature can be generated using a signing algorithm and the private key specific to the terminal. The terminal can generate a digital signature for the information that it stored on the smart card. Specifically, using the private key, the signing algorithm and the information (e.g., store ID, time, count number, etc.), the terminal generates the digital signature. Subsequently, when the customer scans the smart card at a second terminal, the terminal can discover certain information on the smart card. The terminal can verify authenticity of the information stored on the card using the public key, the verifying algorithm and information discovered on the card.

The digital signature stored on the smart can be useful for various reasons. For example, when a smart card is scanned for redeeming points, although certain information on the card can be accurate, e.g., store ID, other information might have been altered, e.g., point values. In other words, a hacker would be motivated to forge the content of a smart card to receive more rewards than what the hacker earned. A digital signature can prevent this by authenticating the value of points stored on the smart card. So long as the private key associated with the terminal which stored the information is remained secret, the digital signature can authenticate the value of points stored on the smart card.

In some example embodiments, before the content is converted into a MAC or digital signature using a signing algorithm, the message or content can be hashed. A hash function is a mathematical algorithm that maps a message of arbitrary size to a bit string of a fixed size (i.e., a hash). A hash function can be a one-way function, i.e., it is infeasible to invert the function. In an example embodiment, the MAC is built from a hash function, and thus, the product is a HMAC. In another example embodiment, the digital signature is built from a hash function.

There are several reasons to make a MAC or digital signature form hashed content as opposed to the content itself. For example, because a hash has a fixed size, the hash of the content can be shorter than the actual content, and thus, the MAC or the digital signature of the hash can be much shorter than the MAC or the digital signature of the actual content. Moreover, because it is faster to hash the content than to convert it into MAC or digital signature, it is faster to convert the hash of the content into a MAC or digital signature. In an example embodiment, the content of the smart card is written using a HMAC.

Figure 4:
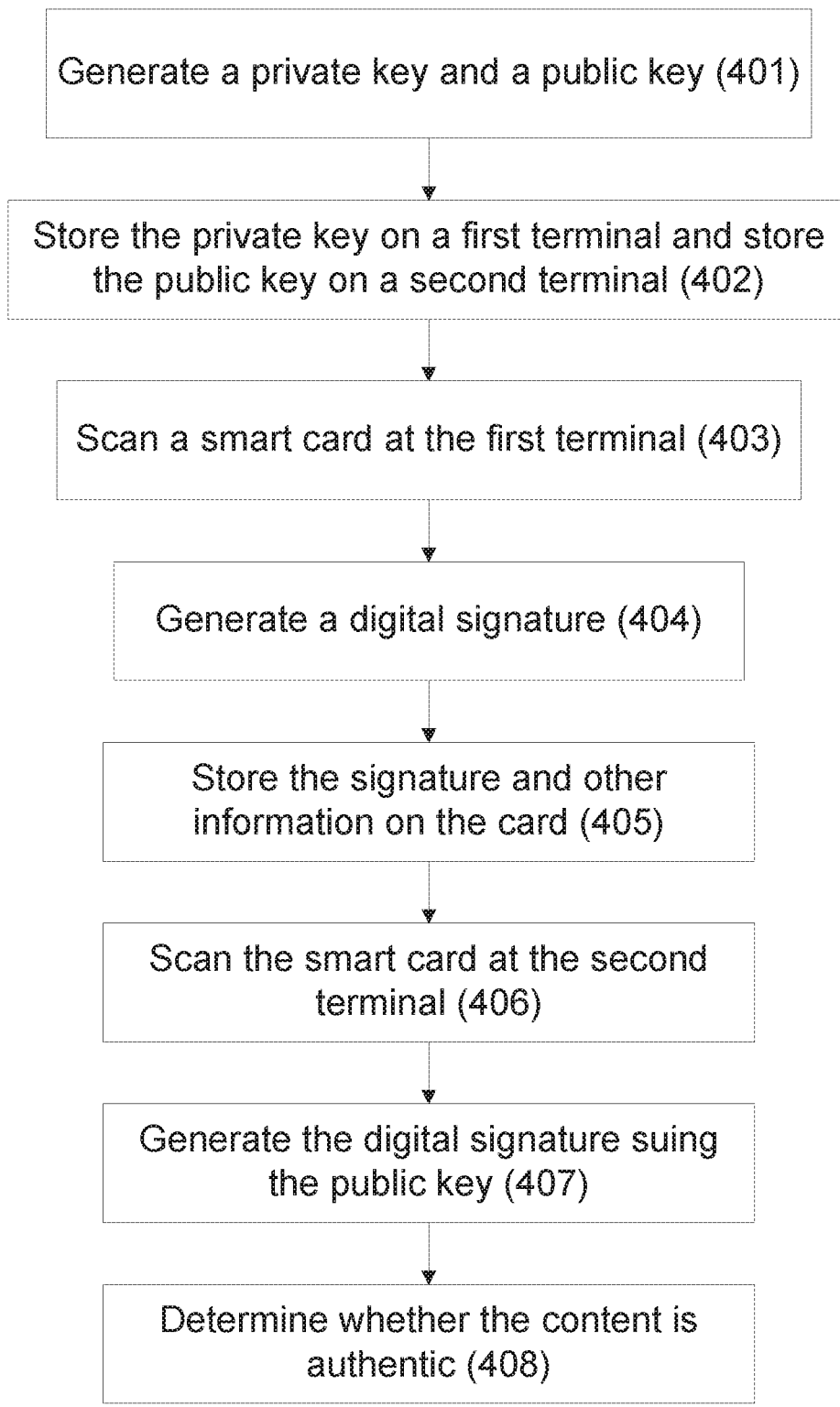
FIG. 4 shows an example flow process for secure storage of information on a smart card using a terminal.

FIG. 4 shows an example flow process for secure storage of information on a smart card using a terminal. In this example flow process, in step 401, a pair of private and public keys are generated. These keys can be generated using a key generation algorithm. In step 402, the private key is stored on a first terminal and the public key is stored on a second terminal. In step 403, a customer scans a smart card at the first terminal to request storage of reward information on the customer's smart card. In this example embodiment, the terminal can additionally receive the smart card's identification information, e.g., the customer's name, identification number, or other identifying information. The terminal can transmit the customer's information to the host computer.

In step 404, the first terminal generates several pieces of information to be stored on the customer's smart card. For example, the terminal can gather a store identification number, a time, a count number, and a reward value to store on the customer's smart card. Using this information and the private key stored on the first terminal, the terminal generates a digital signature. In some embodiments, the information gathered can be hashed before the information is converted into the digital signature. In some embodiments, the digital signature is generated at the host computer. In step 405, the terminal stores the gathered information as well as the digital signature onto the smart card of the customer.

In step 406, the customer scans the card at the second terminal to receive the reward value stored on the card. The second terminal receives the information stored on the smart card, including the digital signature. In step 407, the terminal generates another digital signature using the information scanned from the smart card and the public key stored on the second terminal. In case the digital signature was generated from the hash of the information, the terminal generates the hash of the information prior to generating the digital signature. In step 408, the terminal determines whether the information is authentic by comparing the digital signature stored on the smart card to the digital signature generated using the public key. If the digital signatures match, the customer can be given the reward value stored on the card. If the digital signatures do not match, the terminal can write a code on the smart card to indicate that the card includes fraudulent information, e.g., the terminal can write a code in the smart card to disable the card.

In some embodiments, the smart card and the terminal can operate without any connection to a host computer. As a result, reward information can be stored on the card and authenticated without a host computer. Therefore, by using this system, the need for network compatibility between the terminals can be obviated, particularly when there are multiple parties involved.

In an example embodiment, when a user scans the user's smart card at a terminal, the terminal obtains the information stored on the card. Various types of information can be stored on a smart card. In an example embodiment, a smart card can include financial information stored on the card. This financial information can include an account number, a name of an account holder, a name of a financial institution, an identification number which identifies the account holder, etc. This information can be the same as the information stored on a credit card, debit card or any other payment card. In some embodiments, information such as those included on an individual's driving license can be stored in the smart card. This information can include the user's address, birth date, photo, signature, biometric information, etc. This information can assist the user in signing up for products and services. For example, a store can set up a terminal for signing up visitors for a service. When visiting the terminal, a user can scan the user's smart card at the terminal, and thus provide the terminal with the user's information such as name and address. With this information, the terminal can sign the user up for the service. This information can be stored on any of the zones of the memory of the smart card, e.g., secret zone or confidential zone. Depending on where the information is stored, the information can be accessible using an encryption algorithm, a password, etc.

In an example embodiment, when a user scans a card, the terminal can store certain information on the card. For example, the smart card can store information relating to a rewards program on a user's smart card. FIGS. 5A-C show example data structures stored on an example smart card. In these example embodiments, the customer can scan the customer's smart card in various locations, including stores. Each time the customer scan's the customer's smart card, the terminal stores a set of data on the customer's smart card. For example, the terminal can store an identification number for the store (or a specific location of the store), an identification number for the user, a count number and a digital signature. The identification number for the store is a unique number specific to the store or the terminal. This number identifies which terminal stored the information on the smart card. The identification number for the user is a number which identifies the user. This number can be obtained from the card itself. In some embodiments, the identification number for the user can be obtained from the user who enters the number on a touch pad of the terminal. The count number indicates how many times the user has visited the store (or that specific terminal). In some embodiments, this number is determined by the terminal, which can scan the smart card and determine how many records relating to the specific store location (e.g., Store ID) are present on the smart card. If the terminal discovers more than one record on the terminal, the terminal can determine the count number by adding one to the number of records discovered. In other embodiments, the terminal determines the count number by looking at the counter number of records relating to the specific store location (e.g., Store ID). If a record with the specific Store ID has a count number of greater than 1, the terminal adds another unit to that count number.

Terminals can store other information on smart cards as well. In some embodiments, a terminal can store a credit value or a point value on the smart card. for example, the terminal can be configured to reward the customer for each time the customer visits the store. This reward can be in the form of a credit value or a point value. The store can allow the customer to redeem the points when, for example, the customer is making a purchase.

In the example embodiment of FIG. 5A, the terminal can store a record including a Store ID 501, a User ID 502, a Count No. 503 and a Digital Signature 504 each time the card is scanned at a location with a terminal. For example, a customer with User ID number 559712 can visit a location with Store ID number 1045A89 for the first time. The customer can scan the customer's smart card at this location. Once the customer scans the customer's card at a terminal in this location, the terminal can store a record 505 on the smart card including the Store ID for the terminal, the customer's User ID and a count number 1 (because the customer visited the location for the first time). The terminal can determine that the customer scanned the customer's smart card at this location for the first time by reviewing all the records stored on the customer's smart card. Since there are no other records with the same Store ID number, the terminal determines that the smart card was scanned at this location for the first time. In addition, the terminal can create a digital signature using a private key stored on the terminal. The digital signature can also be stored on the smart card as part of record 505 when the customer scans the smart card at the terminal.

The terminal can also transmit some of this information included in record 505 to the host computer. For example, the terminal can transmit the Store ID, the User ID, the Count No. and the Digital Signature to the host computer to store them for further analysis or for verification at a later point in time. The terminal can also transmit other information to the host computer, e.g., the name of the cardholder (i.e., customer), the card number of the customer, etc.

The customer can also scan the smart card at a second location for a first time. Once scanned at the second location, the terminal at the second location can add a second record 506 for the second location to the smart card. Similar to the record 505, the record 506 shown in FIG. 5B can also include an identification number for the store (i.e., Store ID 501), an identification number for the user (i.e., User ID 502), a count number (i.e., Count No. 503) and a digital signature (i.e., Digital Signature 504). In this example embodiment, the customer visited the second location for the first time. Therefore, the count number for the second location is also 1.

The customer can also scan the smart card at the first location for a second time. Once the customer scans the smart card at the first location, the terminal reviews all the records stored on the smart card and determines that there is a record 505 with the same Store ID number. Therefore, the terminal determines that the customer is visiting the same location for a second time. In response to this determination, there are several ways by which the terminal can create a record to reflect the customer's visit. For example, in some embodiments, the terminal can create a new record on the card. In other embodiments, the terminal can overwrite the Count No. field of the original record. For example, the terminal can overwrite the Count No. 503 for the record 505 with a new number, which indicates the number of times the customer has visited the location plus one. In this case, the Count No. of the record 507 becomes 2 after the customer's second visit to the first location. Other ways of updating the records are also known in the art.

In some embodiments, a customer can present the customer's smart card for, e.g., redemption of points or credit value. In these embodiments, upon reading the records stored on the smart card, the terminal can take an action to prevent rereading of the records again, e.g., to prevent a customer from being rewarded multiple times for the same credit. For example, a terminal can delete the records after reading the records for redemption of points. In other embodiments, the records can be marked with a specific indicator so that other terminals would not read the records when determining how many times a user has visited a particular store.

In an example embodiment, all or some of the rewards transactions conducted by a smart card can be registered on a blockchain, which is an open, distributed ledger that can record transactions between two parties efficiently and in a verifiable and permanent way. For example, each time a customer scans a smart card at a terminal, the terminal saves a Store ID on the smart card. In order to prevent fraudulent transactions, the terminal can transmit this information to a blockchain. Using the blockchain, when the customer presents the smart card for redemption, the terminal can verify the information on the card by comparing it to the entry on the blockchain.

In an example embodiment, the service providers have access to a private blockchain. Each time a user scans the user's smart card, the terminal enters a transaction on the private blockchain. The benefit of this system is that all the participant service providers have access to the accounting ledger for all of the accountholders, and thus, can easily verify whether the balance displayed on the card is genuine.

The communication protocol between a smart card and a terminal can be any communication protocol known by persons of ordinary skill in the art. For example, in an example embodiment, the communication protocol can be NFC, which is a set of communication protocols that enable two electronic devices to establish communication by bringing them close to each other. Other communication protocols can include ISO 7816 for contact cards or ISO 14443 for contactless cards. ISO 14443 (type A and B) also defines two signaling methods.

In an example embodiment, a user is provided with a smart card. The smart card can be compatible with a plurality of terminals such that the terminals can read the content of the memory of the smart card and write over or add to the already written content of the memory. In this example embodiment, the user can visit a location including a terminal. The user can scan the smart card by, e.g., holding the card close to the terminal, inserting the card in the terminal or swiping the card. In an example embodiment, the location can be a retail store, and the user can visit the location because the store offers the user points or credit for visiting the store and scanning the user's smart card at the location.

Upon holding the card close to the terminal, the terminal can write into the memory of the smart card a record indicating the customer's visit to the store, e.g., a location identification number, a user identification number, a time of the visit, a count number, a point or credit value, a digital signature, etc. In some embodiments, the user can visit the location because the retailer credits the user each time the user visits the retailer. As such, once the user holds the smart card close to the terminal, the terminal writes over a count unit field of the memory of the smart card. In other words, the terminal adds one number to the count number. Some stores can offer a discount to their customers based on the value of the count number, e.g., 1 percent discount for each visit.

In an example embodiment, a smart card can store a customer's information such as the customer's name, address, email address, etc. A service provider can provide several terminals at the service provider's location. Each one of these terminals are configured to scan the information stored on a smart card. By scanning the customer's smart card at one of these terminals, the customer can give authorization to the service provider to sign up the customer for a service. Therefore, the smart card can simplify the signup process.

In an example embodiment, a retailer can determine customer interest in a product. For example, the retailer can setup a terminal next to a particular product and ask the customers to scan their cards if they are interested in the product. The retailer can also offer a discount to the customers who have scanned their card prior to purchase of the product. The product can be a product that the retailer will introduce in future, i.e., the product is not available for sale now. Therefore, by allowing customers to scan their card prior to release of the product, the retailer can determine the level of interest for the product, e.g., a host computer can gather and analyze this data.

In an example embodiment, a smart card can be used to offer variable coupons. For example, a retailer can offer several terminals in its store. Each terminal can announce a coupon rate. A customer can scan the customer's smart card and store the coupon on the customer's smart card. The coupon rate can be determined by the retailer based on the demand for a product or the inventory for that product. However, the coupon rate can also be determined by other factors such as the customer's count number for that store. Because the coupon rate can be announced at the terminals in the store, customers can be encouraged to visit the store and receive the coupon value. At the same time, based on fluctuations in demand, the retailer can change the coupon rate and facilitate sales transactions.

In an example embodiment, a smart card can be used as an identification card to prove that the cardholder has visited a particular location. For example, a cardholder can be a security guard who has to visit several locations throughout the guard's shift. These locations can be provided with terminals, one at each location. The security guard can be provided with a smart card, and when the security guard visits these locations, the security guard can scan the smart at each location. Each terminal can create on the smart card a record of the respective location that the guard has visited, and thereby the guard can prove that he has visited these locations.

In an example embodiment, the data gathered by scanning smart cards at various terminals can be gathered and aggregated at the host computer. The host computer can gather data relating to customers' shopping habits. The host computer can use this data as well as other data, e.g., credit card sales receipts, to analyze sales patterns and derive a dynamic demand curve. The host computer can transmit this information to retailers and service providers and recommend coupon rates based on this analysis. Based on these recommendations, retailers and service providers can offer coupons to their customers to encourage sales transactions.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only and is not intended to be limiting.

The invention claimed is:

1. A payment terminal comprising:
a processor, a memory and a transceiver, wherein:
the processor is configured to generate:
a first signal including instructions to enable a card processor to store a set of data on a card memory of a card, wherein the set of data includes a count number; and
a second signal including instructions to enable the card processor to update the set of data on the card memory, wherein the updating includes incrementing the count number by one unit; and
the transceiver is configured to:
transmit to the card the first signal and the second signal; and
receive from the card a third signal including all the sets of data stored on the memory of the card.

2. The payment terminal of claim 1, wherein the processor is configured to:
generate a digital signature using a private key and the count number; and
include the digital signature in the set of data.

3. The payment terminal of claim 2, wherein the processor is configured to:
generate a second digital signature using the private key and the sets of data received from the card; and
compare the digital signature with the second digital signature.

4. The payment terminal of claim 3, wherein the processor is configured to:
authorize a transaction if the digital signature matches the second digital signature; and
generate a fourth signal for transmission to the card to mark the sets of data as read.

5. The payment terminal of claim 1, wherein the second signal is configured to cause the card processor to:
overwrite the set of data stored on the card; or create a new record including a new count number.

6. The payment terminal of claim 1, wherein the processor is further configured to cause the transceiver to transmit the sets of data to a host computer through a network connection.

7. The payment terminal of claim 1, wherein the payment terminal is located at a store.

8. The payment terminal of claim 7, wherein:
the count number indicates how many times a user of the card has visited the store and scanned the card at the payment terminal; and
the processor is configured to authorize a transaction and process a discount based on the count number.

9. The payment terminal of claim 1, wherein the processor is further configured to, in response to receiving the third signal, generate a fifth signal and cause the transceiver to transmit a fifth signal to the card, wherein the fifth signal is configured to cause the card processor to store a reward value on the card.

10. The payment terminal of claim 9, wherein:
the transceiver is configured to receive a sixth signal indicating the reward value from the card; and
the processor is configured to process the sixth signal to authorize a transaction based on the reward value.

11. The payment terminal of claim 1, wherein the processor is configured to generate a seventh signal indicating a coupon rate and the transceiver is configured to transmit the seventh signal to the card.

12. The payment terminal of claim 11, wherein
the transceiver is configured to receive an eighth signal indicating the coupon rate from the card; and
the processor is configured to process the eighth signal to authorize a transaction based on the coupon rate.

13. A payment card comprising:
a processor, a memory and a transceiver, wherein:
the transceiver is configured to receive a first signal and a second signal form a payment terminal and transmit a third signal to the payment terminal;
the processor is configured to:
in response to receiving the first signal, store a set of data on the memory of the payment card, wherein the set of data includes a count number;
in response to receiving the second signal, update the set of data by incrementing the count number by one unit; and
generate the third signal including all the sets of data stored on the memory of the payment card.

14. The payment card of claim 13, wherein the set of data includes a digital signature.

15. The payment card of claim 13, wherein the processor is configured to mark the sets of data as read.

16. The payment card of claim 13, wherein, in response to receiving the second signal, the processor is configured to overwrite the set of data stored on the payment card or create a new record including a new count number.

17. The payment card of claim 13, wherein the count number indicates how many times a user of the payment card has visited a store and scanned the payment card at the payment terminal.

18. The payment card of claim 13, wherein, in response to receiving a fourth signal, the processor is configured to store a reward value on the payment card.

19. The payment card of claim 13, wherein, in response to receiving a fourth signal, the processor is configured to store a coupon rate on the payment card.

20. The payment card of claim 13, wherein the transceiver is configured to receive a fifth signal configured to power up the payment card to enable the processor to function without any power source on the payment card.

* * * * *